(12) United States Patent
Bergamasco et al.

(10) Patent No.: US 6,675,220 B1
(45) Date of Patent: Jan. 6, 2004

(54) TECHNIQUES FOR THE HARDWARE IMPLEMENTATION OF RANDOM EARLY DETECTION MECHANISMS

(75) Inventors: Davide Bergamasco, San Jose, CA (US); Thomas J. Edsall, Cupertino, CA (US); Guglielmo M. Morandin, Milpitas, CA (US); Keith McCloghrie, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/372,480

(22) Filed: Aug. 11, 1999

(51) Int. Cl.[7] ................................................. G06F 15/16
(52) U.S. Cl. ....................... 709/232; 709/233; 709/234; 709/235
(58) Field of Search ................................ 709/232, 234, 709/235, 233; 370/229, 336, 249

(56) References Cited

U.S. PATENT DOCUMENTS

| | | | | |
|---|---|---|---|---|
| 5,231,633 A | * | 7/1993 | Hluchyj et al. | 370/94.1 |
| 5,936,958 A | * | 8/1999 | Soumiya et al. | 370/395 |
| 5,974,518 A | * | 10/1999 | Nogradi | 711/173 |
| 6,167,445 A | * | 12/2000 | Gai et al. | 709/223 |
| 6,252,848 B1 | * | 6/2001 | Skirmont | 370/229 |
| 6,333,917 B1 | * | 12/2001 | Lyon et al. | 370/236 |

OTHER PUBLICATIONS

Jacobsen et al., "RED in a different light" Jun. 1, 1999.*
Jacobson et al., "RED in a Different Light," Jun. 1, 1999.
Lin et al., "Dynamics of Random Early Detection," Sep., 1997, ACM SIGCOMM'97 Conference, Palais de Festivals, Cannes, France.
Floyd et al., "Random Early Detection Gateways for Congestion Avoidance," Aug. 1993, IEEE/ACM Transactions on Networking.

* cited by examiner

Primary Examiner—Frantz B. Jean
(74) Attorney, Agent, or Firm—Ritler, Lang & Kaplan LLP

(57) ABSTRACT

Techniques for managing queues of packets are provided. Once the average queue size crosses a minimum threshold, packets are dropped according to a probability. Once a packet is dropped, the minimum threshold is increased in order to decrease the likelihood that a subsequent packet will be dropped. As packets are accepted, the minimum threshold is decreased gradually to its original value so that the distribution of dropped packets is very uniform.

27 Claims, 13 Drawing Sheets

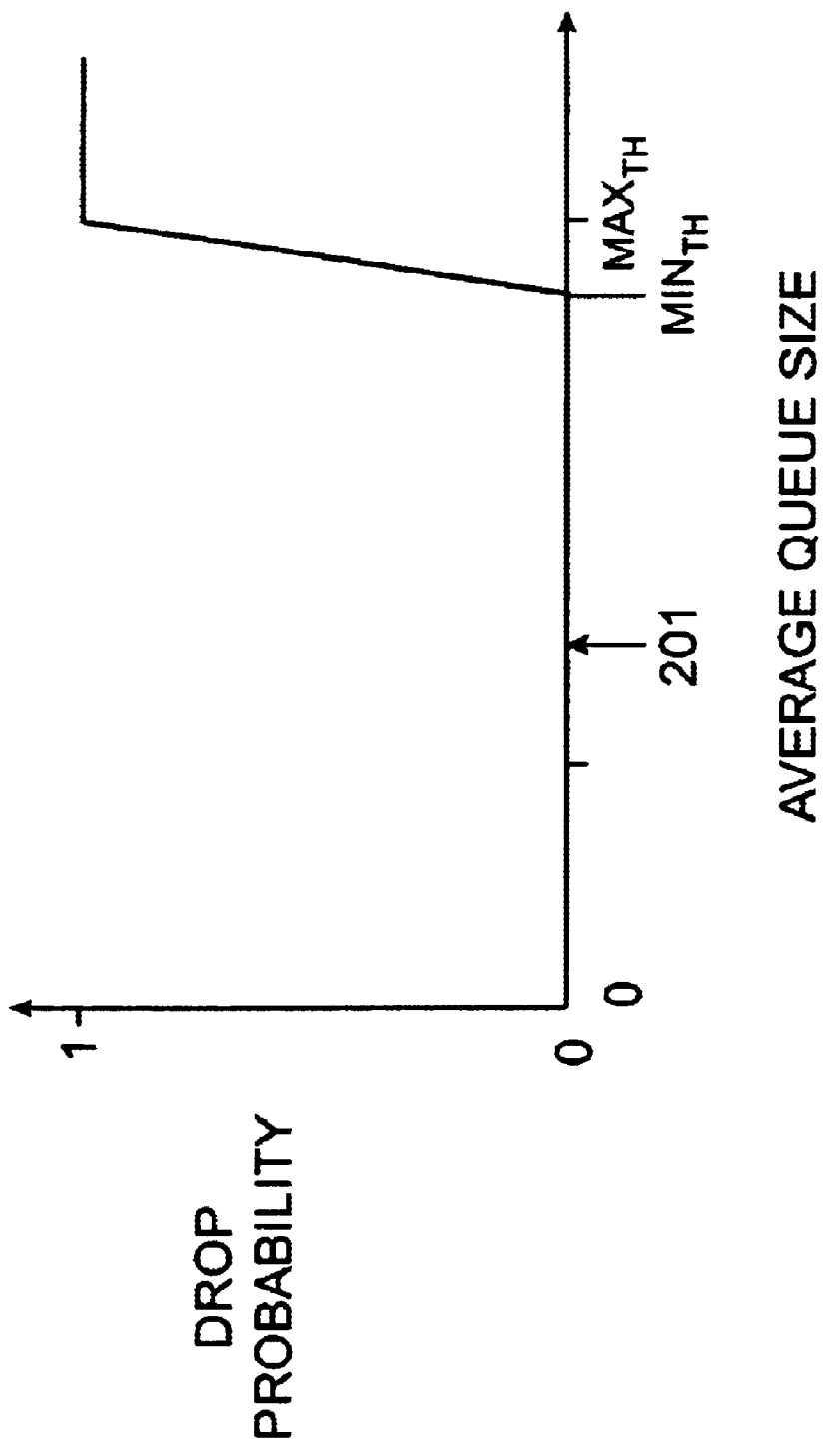

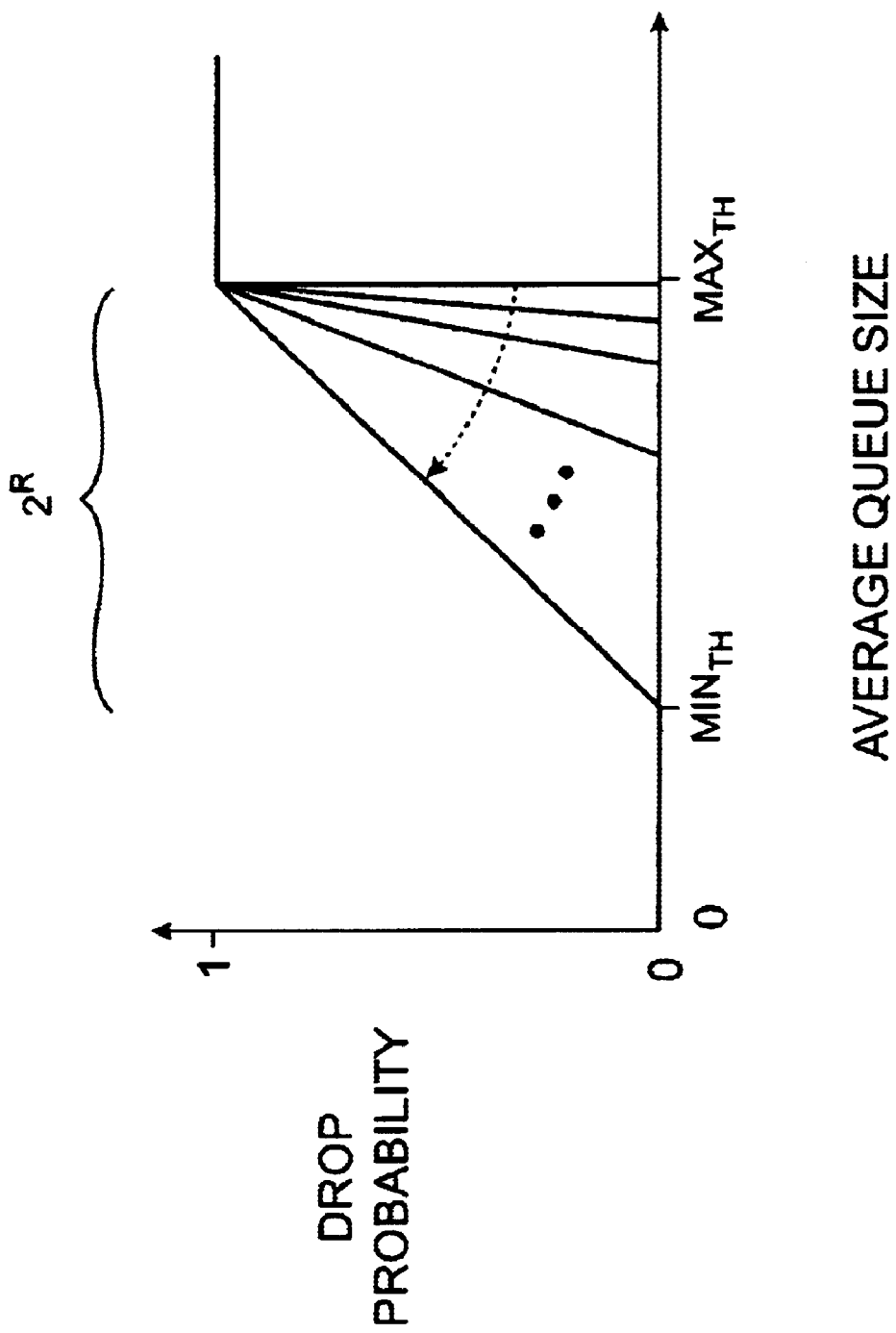

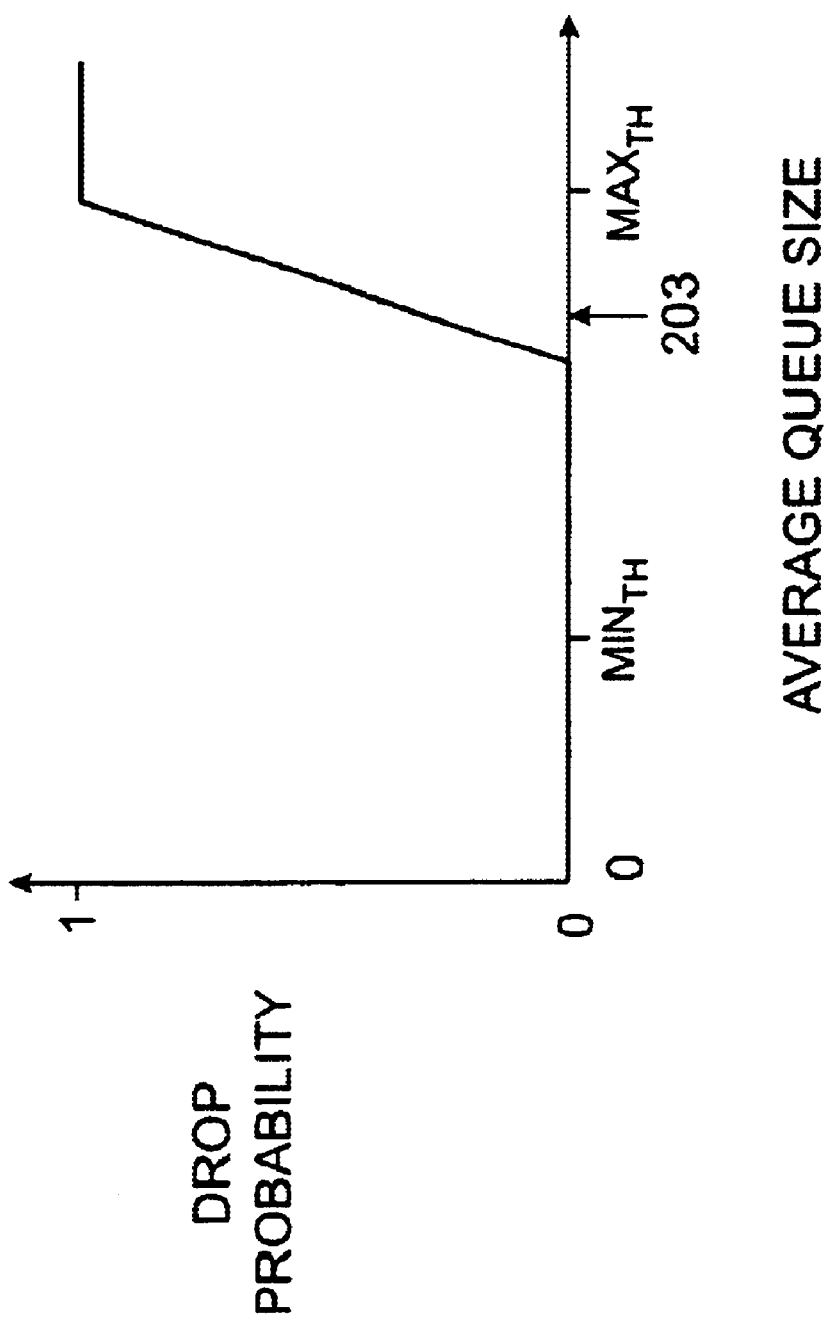

TECHNIQUES FOR THE HARDWARE IMPLEMENTATION OF RANDOM EARLY DETECTION MECHANISMS

BACKGROUND OF THE INVENTION

The present invention relates to managing a queue of packets to avoid congestion. More specifically, the invention relates to improved techniques for implementing in hardware Random Early Detection (RED) mechanisms.

Random Early Detection (RED) was originally conceived as a congestion avoidance mechanism to be embedded in Internet routers. The basic principle behind RED is to control the average length of a router output queue in order to avoid long term congestion. For each incoming packet, the average queue length is calculated. If the average queue length is below a predefined minimum threshold, the packet is accepted and stored in the output queue for transmission.

If the average queue size is above the minimum threshold but below a predefined maximum threshold, a probability is computed and the packet gets dropped (or marked) according to this probability. The probability is proportional to the average queue size so the larger the queue size, the higher is the probability for an incoming packet to get dropped. Finally, if the average queue size is above the maximum threshold, all incoming packets are dropped until the average queue size falls again below the maximum threshold. More details on RED may be found in "Random Early Detection Gateways for Congestion Avoidance," Sally Floyd et al., IEEE/ACM Transactions on Networking, August 1993, which is hereby incorporated by reference.

Depending on the particular transport layer protocol used, when packet drops are detected, the sources can take appropriate countermeasures such as, for instance, backing off their transmission rates in order to reduce the traffic volume at the congested router. For example, if the transport protocol exploited is the Transmission Control Protocol (TCP), the loss of a packet is interpreted as a congestion indication and the TCP sources immediately reduce their transmission rates. Discarding packets is also a useful means to control the average queue size when non-reactive transport protocols such as User Datagram Protocol (UDP) are utilized. If packets are not dropped but instead are marked, it is the responsibility of the transport protocol to take the appropriate counter measures when it detects packets that have been marked by RED.

There are a number of advantages in using RED. The stochastic nature of RED guarantees that the number of dropped packets for a connection is proportional to the bandwidth currently being used by the connection. Also, global synchronization phenomena among different TCP sources do not occur because RED routers drop packets individually rather than in bursts as tail drop routers do. Moreover, by keeping the average queue size low, RED is able to reduce the average end-to-end delay while allowing occasional traffic bursts to find enough room to be accommodated within queues without significant losses.

However, there are a number of disadvantages with conventional implementations of RED. Firstly, the probability of dropping packets RED relies upon should ensure that the distribution of dropped packets is relatively uniform. However, in most RED in hardware implementations based on simplifications of the conventional scheme it is very likely for the distribution of packet drops to be highly non-uniform (e.g., multiple packets are dropped in a row). Additionally, packets can be dropped even after the current queue size has fallen below the minimum threshold because the average queue size is still above the minimum threshold. Finally, conventional implementations of RED are not very suitable for a hardware implementation because they are based on computations that involve a number of noninteger multiplications and divisions and also exploit an exponential function.

It would be beneficial to have improved techniques for queue management schemes such as RED. It would also be beneficial to have techniques for improving the distribution of dropped packets and preventing packets from being dropped when the current queue size is below the minimum threshold. Additionally, it would be beneficial to have techniques for easily implementing RED hardware, in order to exploit this mechanism in high speed devices such as a local area network (LAN) switch.

SUMMARY OF THE INVENTION

The present invention provides techniques for managing queues of packets, such as in RED. When the size (average or otherwise) of the queue is greater than a minimum threshold, packets are dropped according to a probability. Once a packet is dropped, the minimum threshold is increased so that it is unlikely that subsequent packets will be dropped, unless the size of the queue is greater than a maximum threshold. As packets are received without being dropped, the minimum threshold is decreased until it reaches its original value. Thus, the distribution of dropped packets is more uniform. Some specific embodiments of the invention are described below.

In one embodiment, the invention provides a method of managing a queue of packets. A packet is received and the average queue size is calculated. If the average queue size is above a minimum threshold, the packet is dropped according to a probability and if the packet is dropped, the minimum threshold is increased. In a preferred embodiment, if the average queue size is greater than a maximum threshold, the probability is 1 so the packet is dropped with complete certainty.

In another embodiment, the invention provides a method of managing a queue of packets including receiving a packet. The average queue size is calculated and the current queue size is determined. Then, a comparison queue size is calculated as the lesser of the average queue size and the current queue size. The comparison queue size is utilized to determine whether to drop the packet, such as in RED. In a preferred embodiment, the average queue size is calculated at specified time intervals.

In another embodiment the invention provides a method of managing a queue of packets including receiving a packet. A random number is generated and a bit-mask is utilized to mask the random number. If the sum of a queue size and the masked random number is greater than a maximum threshold, the packet is dropped and the mask is reset. When a specified number of packets is received without dropping a packet, the mask is shifted to increase the potential size of the masked random number. In a preferred embodiment, the queue size is a lesser of an average queue size and the current queue size.

Other features and advantages of the invention will become readily apparent upon review of the following description in association with the accompanying drawings.

BRIEF DESCRIPTION OF THE DRAWINGS

FIGS. 2A–2F show graphical plots of drop probability versus average queue size in an embodiment of the invention.

FIG. 3 shows a graphical plot of drop probability versus average queue size similar to FIG. 2E except that the current queue size is greater than the minimum threshold.

DETAILED DESCRIPTION OF PREFERRED EMBODIMENTS

In the description that follows, the present invention will be described in reference to embodiments that manage queues of packets such as in a LAN switch. More specifically, the embodiments will be described in reference to techniques that are particularly well suited for hardware implementations. However, the invention is not limited to devices within LANs such as switches, routers, bridges, and the like as the invention can be advantageously applied to devices in wide area networks (WANs) such as the Internet. Furthermore, the invention is not limited to hardware implementations or the specific techniques described herein as the invention can be implemented in different ways both in hardware and software. Therefore, the description of the embodiments that follows is for purposes of illustration and not limitation.

Figure 1:
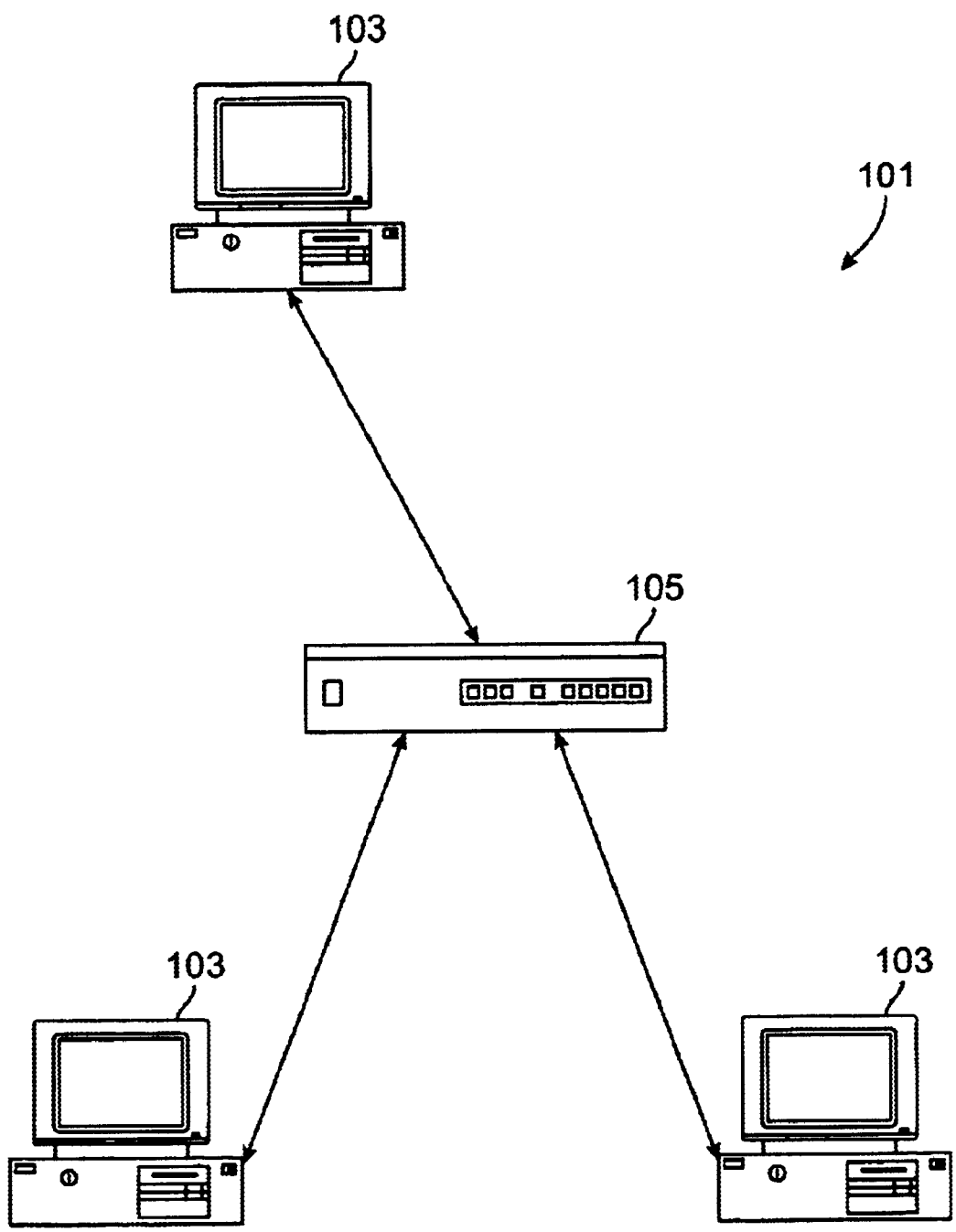
FIG. 1 shows an example of a LAN including a switch.

FIG. 1 shows a LAN including a switch. LAN 101 includes multiple computer systems 103 in communication with each other through a switch 105. Switch 105 directs the flow of electrical or optical signals representing packets among computer systems 103. Within switch 105, there are a number of queues (at least one per port) not shown in FIG. 1, that store incoming packets before they are sent to their intended destination. Additionally, in preferred embodiments there is an integrated circuit, such as an Application Specific Integrated Circuit (ASIC), that manages the queues within switch 105. In other embodiments, computer code that implements the invention can be stored in a computer readable medium, such as memory or a disk, that is executed by a processor within switch 105.

RED is a congestion avoidance mechanism conceived to operate on Internet routers. However, LANs are different from the Internet in a number of ways: low propagation delay, high bandwidth links, a larger percentage of UDP traffic, and the like. To deal with this high speed environment, it would be beneficial to have a hardware implementation of RED for LAN switches. In order to make this possible, it would be preferable if the computations involved were fairly simple so they can be easily implemented in the hardware of a LAN switch. Switch 105 is representative of any device in a LAN such as a switch, router, bridge, and the like.

FIGS. 2A–2F show graphical plots of drop probability versus average queue size in order to illustrate an embodiment of the invention. In the graphical plots, the average queue size increases along the x axis. Along the y axis, the drop probability can vary between 0 and 1. Now it may be useful to describe the graphical plots in more detail.

Figure 2A:
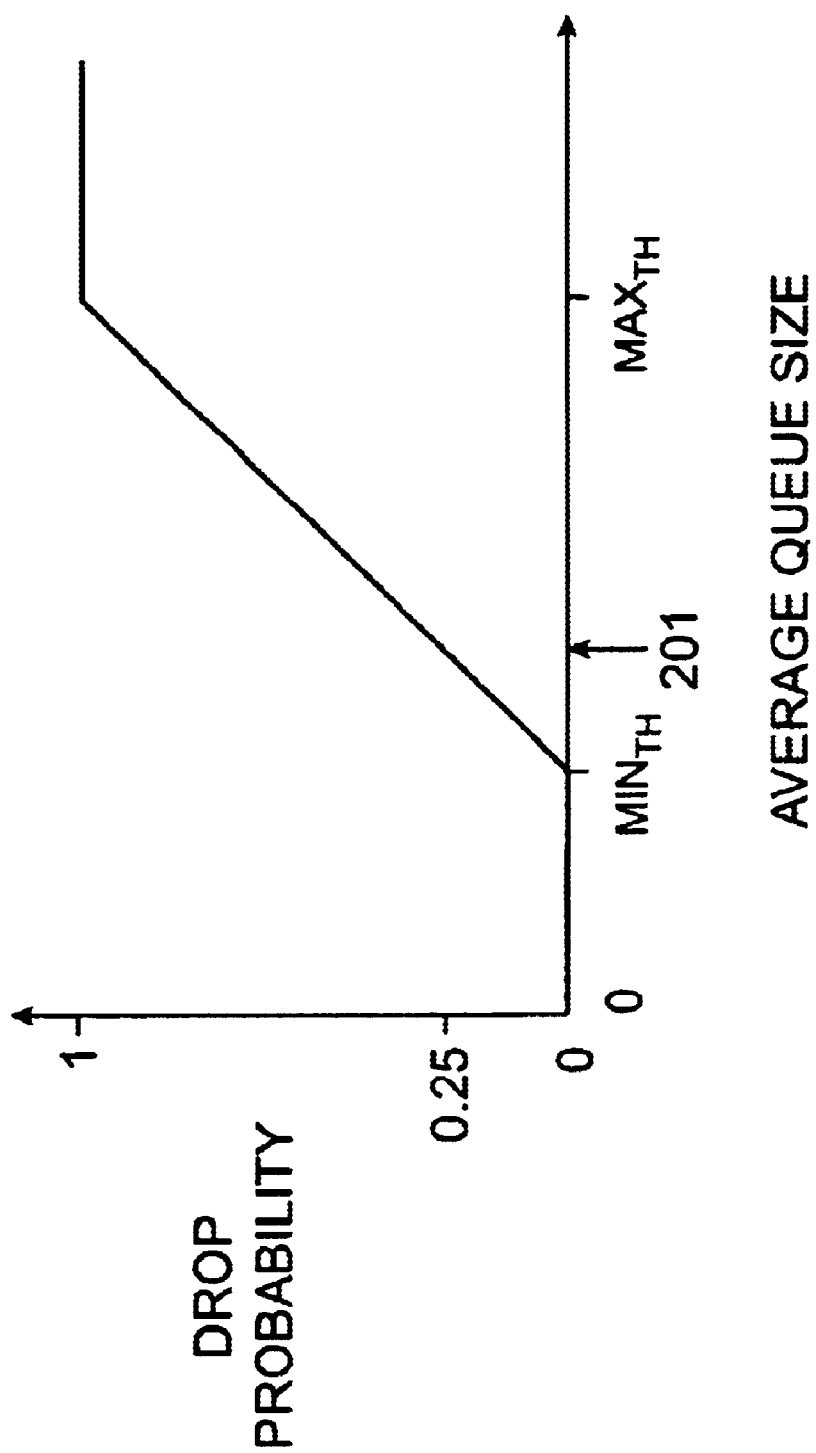

In FIG. 2A, it can be seen that when the average queue size is between 0 (or some small value) and a minimum threshold, the drop probability is 0 meaning that no packets will be dropped. When the average queue size is between the minimum threshold and a maximum threshold, packets will be dropped according to a drop probability that increases in proportion to the average queue size. As an example, if the average queue size is as shown by an arrow 201, a received packet would be dropped according to the probability shown, roughly a probability of 0.25 or 25%. The drop probability would increase if the average queue size increased. When the average queue size is above the maximum threshold, packets will be dropped according to probability of 1, which means that all packets that are received when the average queue size is above the maximum threshold will be dropped.

In an aspect of the invention, once a packet is dropped, the likelihood that a subsequent packet will be dropped is drastically reduced, virtually to 0. Conceptually, this can be viewed as increasing the minimum threshold so that subsequent packets will not be dropped unless the average queue size is greater than the maximum threshold. This can be seen more clearly in reference to FIG. 2B.

Figure 2B:
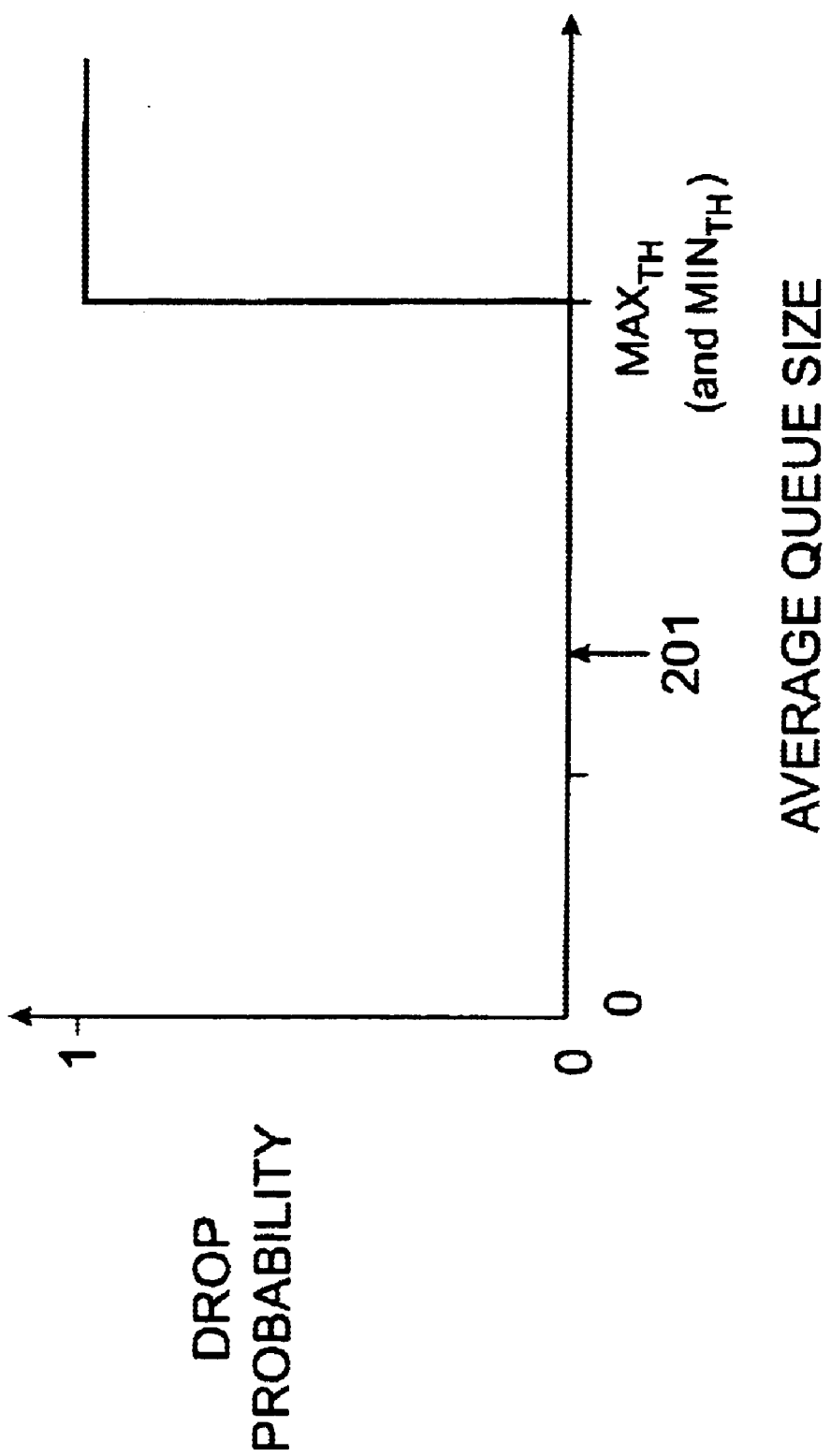

In FIG. 2B, assume that the received packet was dropped when the average queue size in FIG. 2A was as represented by arrow 201. Thus, the minimum threshold was increased to be equal to the maximum threshold as shown in FIG. 2B. In this manner, a subsequent packet will not be dropped unless the average queue size is above the maximum threshold, but this is virtually impossible because the average queue size cannot increase past the maximum threshold with just a single packet. This acts to prevent consecutive packets from being dropped. Although in preferred embodiments the minimum threshold is increased to equal the maximum threshold, in other embodiments, the minimum threshold may be increased to a lesser extent.

Continuing with this example, assume that the average queue size remains roughly equal to what is represented by arrow 201. After a specified number of packets are accepted (e.g., 5 packets), the minimum threshold is decreased as shown in FIG. 2C.

Figure 2C:
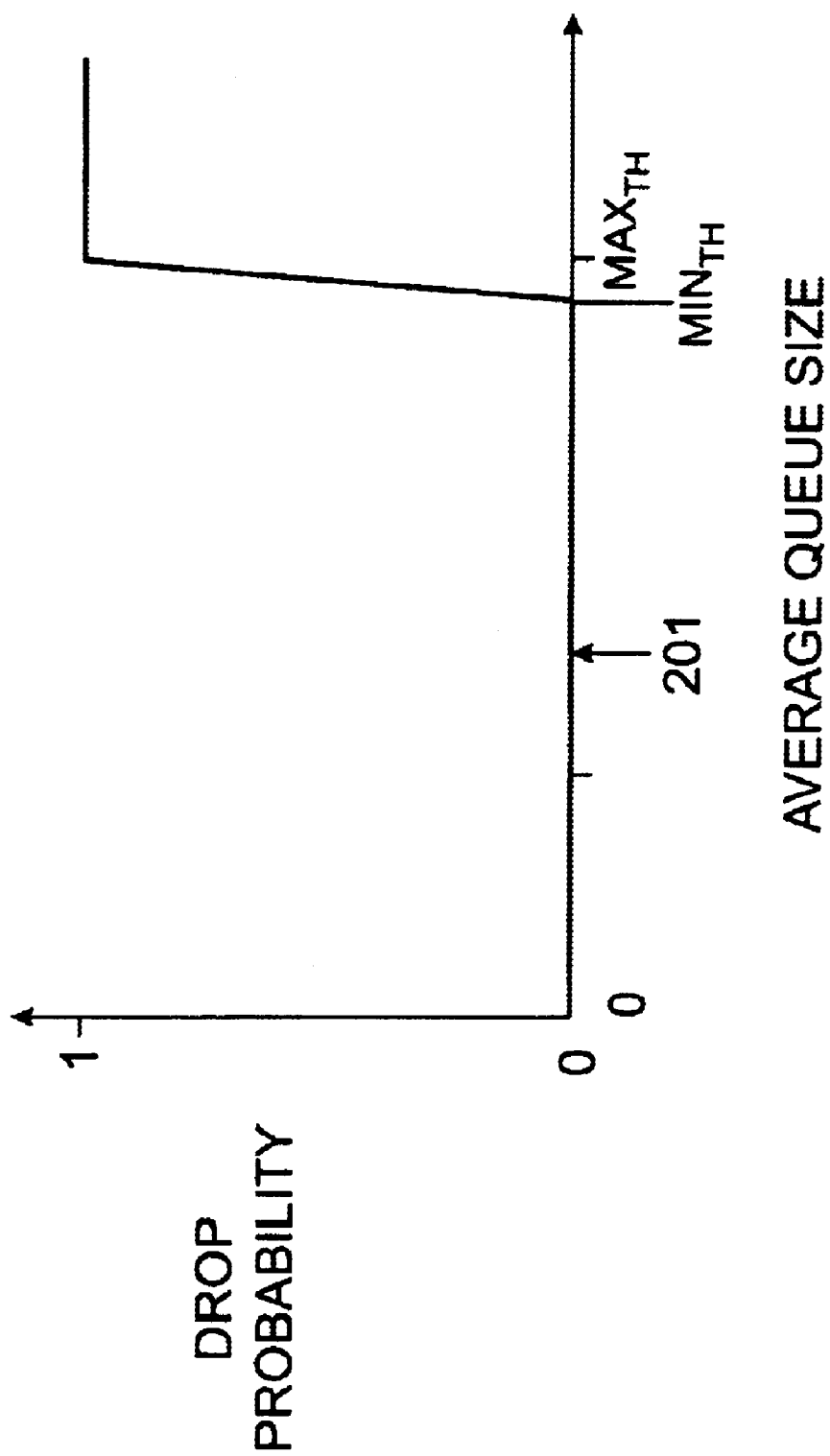

If the average queue size remains as represented by arrow 201 in FIG. 2C, packets will continue to be accepted. After a specified number of packets are accepted, once again the minimum threshold is decreased as shown in FIG. 2D. Assuming another specified number of packets is accepted, the minimum threshold is decreased as shown in FIG. 2E.

It should be clear that as more and more packets are accepted, the minimum threshold moves from the maximum threshold back to its original location. This change in the minimum threshold as packets are accepted is shown in FIG. 2F. The specified number of packets that are accepted before the minimum threshold is decreased can either be constant or varied according to some criteria such as, for example, the number of different flows across the queue or the total number of packets accepted since the last packet drop. In preferred embodiments, the specified number of packets is a constant that has been determined to be efficient for the specific environment. Additionally, in preferred embodiments the minimum threshold is decreased in an exponential manner such as by an amount that increases exponentially each time a specified number of packets are received without dropping a packet. More specifically, the distance between the minimum threshold and the maximum threshold is a power of 2 (as shown in FIG. 2F as $2^R$). More details on the exponential nature of the decreases in the minimum threshold will be described in more detail in reference to FIG. 7.

In the preceding discussion, it was assumed that the average queue size remained fairly constant as represented by arrow 201. This assumption was for the purposes of simplifying the discussion of the graphical plots in FIGS. 2A–2F. As one would expect, the average queue size is not necessarily constant and may be increasing if packets are continually accepted, depending upon the frequency and size of the packets.

Figure 2E:
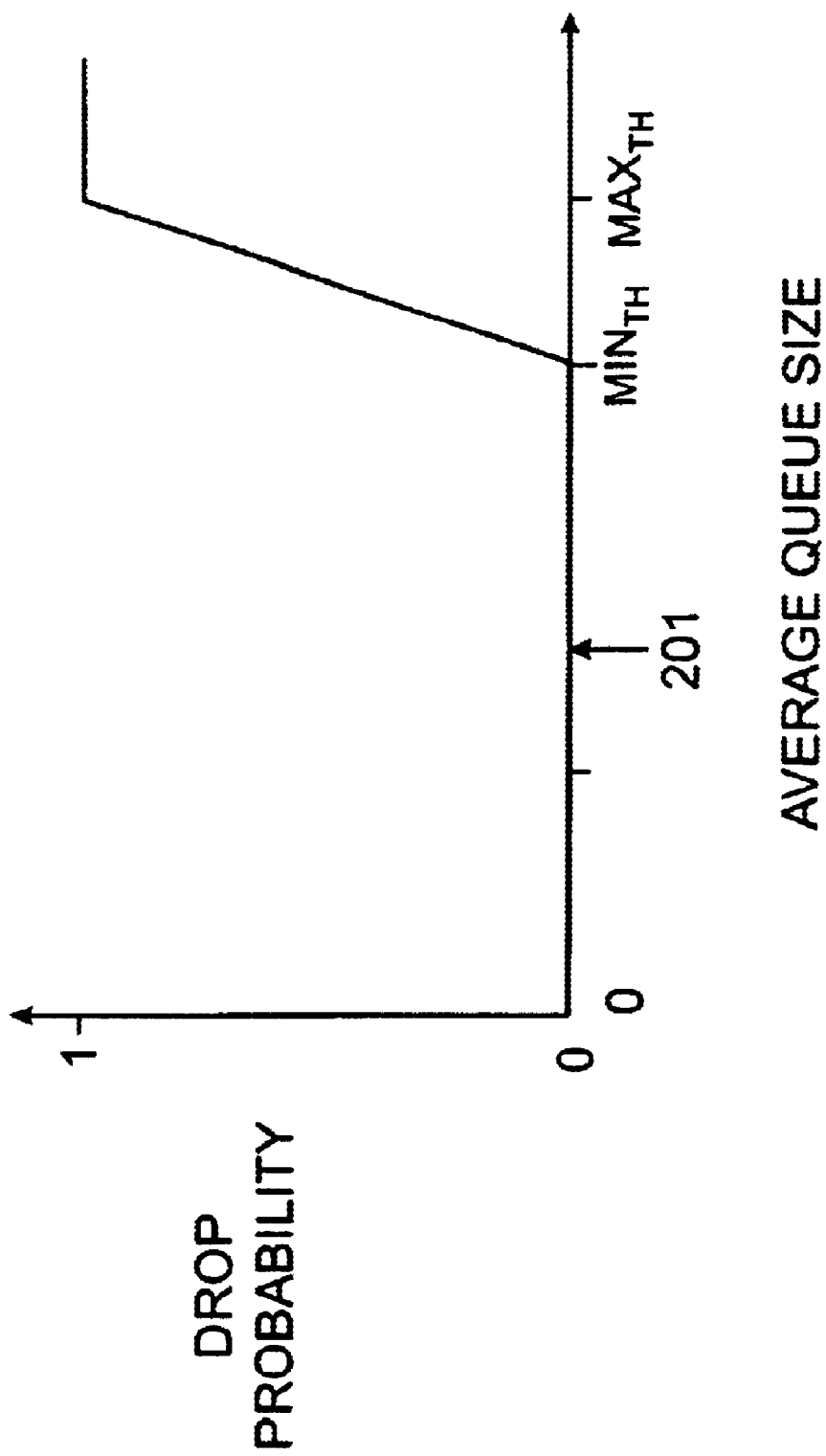

FIG. 3 shows a graphical plot that is similar to FIG. 2E except that in this case the average queue size has increased to what is represented by an arrow 203. Since the average queue size is now greater than the minimum threshold, the received packet would be dropped with probability P and the graphical plot would once again resemble that which is shown in FIG. 2B. In other words, once a packet is dropped, the minimum threshold is increased to make it more unlikely that a subsequent packet will be dropped. As packets are accepted, however, the minimum threshold is decreased to its original value so that it becomes more and more likely that a packet will be dropped. In this manner, the resulting distribution of packet drops is extremely uniform and does not rely solely upon the drop probability to distribute the packet drops.

Figure 4:
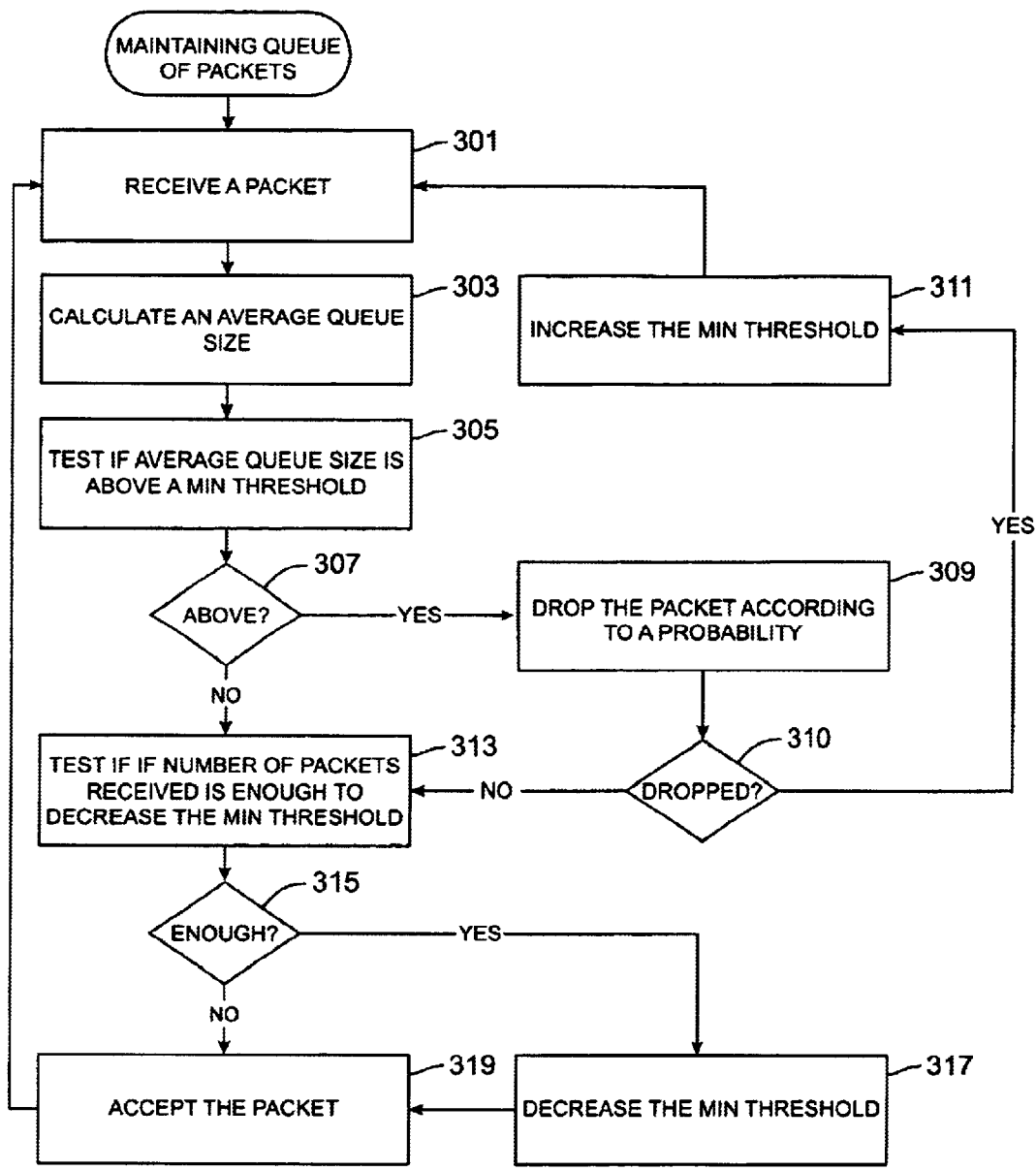
FIG. 4 shows a flow chart of a process of managing a queue of packets.

Now that aspects of the invention have been described in reference to graphical plots it may be beneficial to describe a process of managing a queue of packets. FIG. 4 shows a flow chart of a process of managing a queue of packets according to one embodiment of the invention. At a step 301, a packet is received. An average queue size is calculated at a step 303. As with all the flow charts described herein, no order of the steps should necessarily be implied by the flow charts. Steps may be added, deleted, reordered, and combined without departing from the spirit and scope of the invention. As an example, in preferred embodiments, the average queue size is not calculated when a packet is received but instead at periodic intervals. This process will be described in more detail in reference to FIG. 5 but it illustrates that an order to the steps should not necessarily be implied by the order in which the steps are described in reference to the flow charts.

The average queue size can be calculated according to the following equation:

$$\text{new\_avg} = (1-w_q) \cdot \text{prev\_avg} + w_q q$$

In the above equation, the prev_avg is the previous value of the average queue size, q is the current (or instantaneous) queue size and $w_q$ is a weighting factor that is tuned in order to make the average queue size more or less sensitive to the current queue size.

At a step 305, the average queue size is tested to assess if it is above a minimum threshold. If the average queue size is determined to be above a minimum threshold at a step 307, the packet is dropped according to a probability at a step 309. Typically, the drop probability increases in proportion to the average queue size. However, the drop probability can be calculated in a variety of different ways to suit the specific environment.

At a step 310, it is determined if the packet has been dropped. If the packet has actually been dropped, the minimum threshold is increased at a step 311. In a preferred embodiment, the minimum threshold is increased to be equal to a maximum threshold but the minimum threshold can be increased less if desired. The flow then returns to step 301 where the next packet is received.

If at step 307 it is determined that the average queue size is not above a minimum threshold, the number of packets that have been received without being dropped is tested to see if it is enough to decrease the minimum threshold at a step 313. Each time a specified number of packets is received without being dropped, the minimum threshold is decreased so that if enough packets are received without being dropped, the minimum threshold returns to its original value. The specified number of packets can be a constant (e.g., 5) or it can vary depending on the total number connections across the queue or other criteria such as the total number of packets received without dropping, the average queue size, or the current queue size.

If it is determined that the number of packets received without dropping a packet is enough to decrease the minimum threshold at a step 315, the minimum threshold is decreased at a step 317. The minimum threshold can be decreased by a constant amount or in preferred embodiments, the minimum threshold is decreased in an exponential manner. In other embodiments, the minimum threshold can be decreased in other ways depending on the environment and desired operation.

At a step 319, the packet is accepted. Accepting the packet typically means that the packet will be stored in the queue until it is the packet's turn to be output to its destination. Accordingly, accepting the packet increases the current queue size and possibly the average queue size depending on how often and the manner in which it is calculated.

Figure 5:
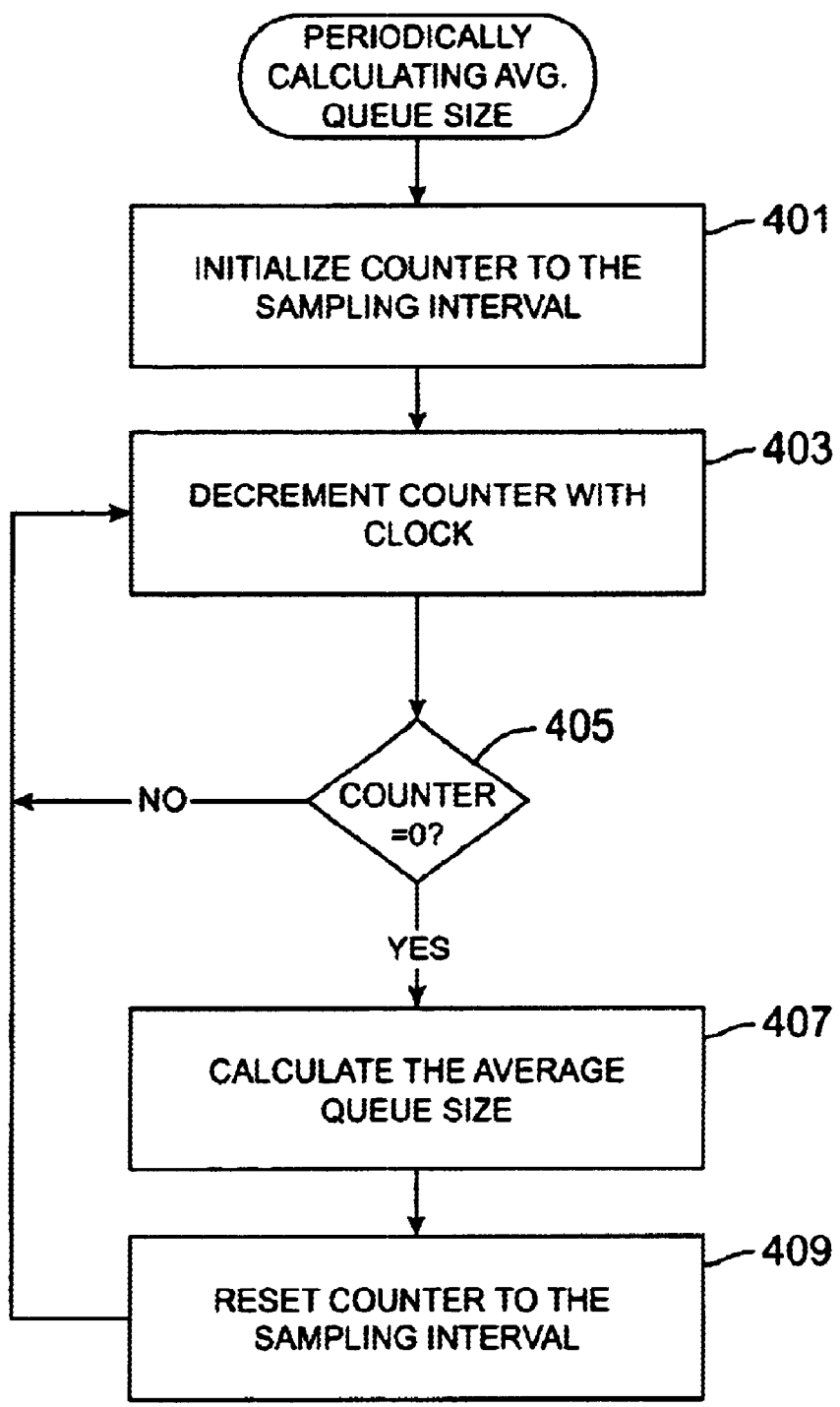
FIG. 5 shows a flow chart of a process of periodically calculating the average queue size.

In one aspect of the invention, the average queue size is calculated periodically as shown in the flow chart of FIG. 5. Instead of calculating the average queue size when a packet is received, the average queue size is calculated at specific time intervals as follows.

At a step 401, a counter is initialized to the sampling interval. For example, the sampling interval can be the number of clock "ticks" between the periodic calculation of the average queue size.

At each clock cycle, the counter is decremented at a step 403. If it is determined that the counter is equal to zero at a step 405, the average queue size is calculated at a step 407. The average queue size can be calculated according to the equation shown above or any other calculation that one deems suitable. In a preferred embodiment, the average queue size is calculated according to the free pool that is remaining instead of the actual queue size.

At a step 409, the counter is reset to the sampling interval. The flow chart of FIG. 5 shows a process of periodically calculating the average queue size in a manner that can be advantageously applied to hardware implementations.

Figure 6:
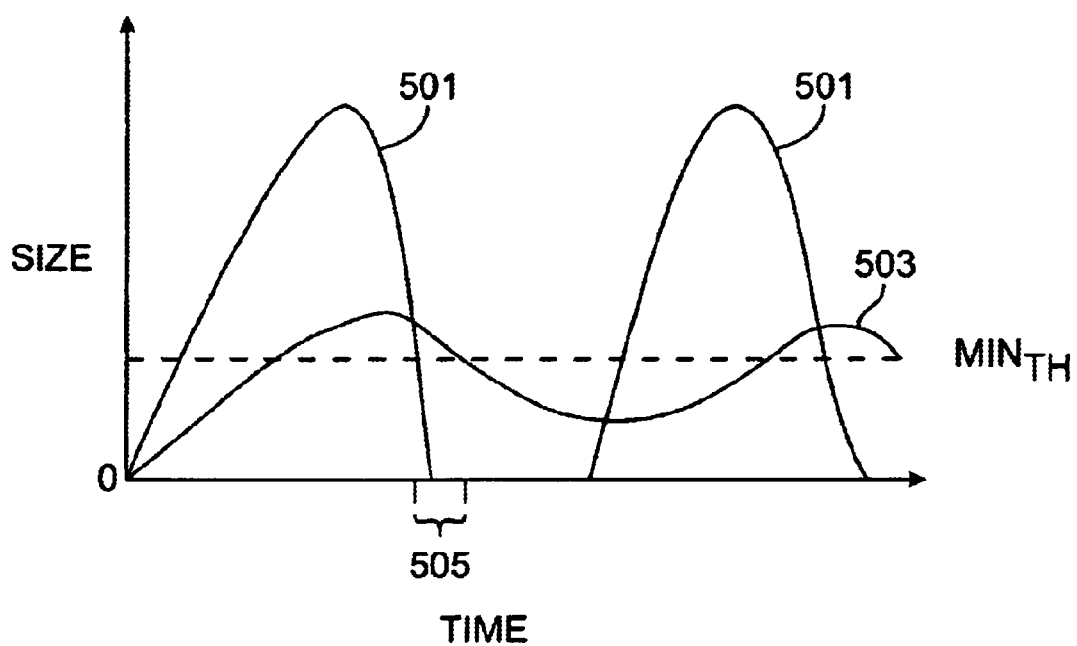
FIG. 6 shows a graphical plot of size of the queue versus time in order to illustrate that only utilizing the average queue size can result in dropped packets when the current queue size is less than the minimum threshold.

There are benefits for using the average queue size instead of the current (or instantaneous) queue size. However, there are times when utilizing the average queue size can result in dropped packets even when the current queue size is below the minimum threshold. In order to illustrate this, FIG. 6 shows a graphical plot of an example of the average and current queue sizes versus time.

As a current queue size 501 increases, an average queue size 503 also increases but at a slower rate as would be expected for an average. Similarly, when current queue size 501 decreases, average queue size 503 decreases also but at a slower rate.

During a time interval 505, current queue size 501 has fallen below the minimum threshold. However, as shown in FIG. 6, average queue size 503 still remains above the minimum threshold. This means that during time interval 505, packets can be dropped even though the current queue size is below the minimum threshold.

In order to avoid dropping packets when the current queue size is below the minimum threshold, a comparison average can be calculated as follows:

$$comp\_avg=\min\{new\_avg,q\}$$

The comparison average comp_avg is the minimum of the average queue size (here denoted new_avg to be consistent with the previous equation) and q, which is the current queue size. The comparison average can be utilized in the process of managing the queue of packets so that whenever the current queue size falls below the minimum threshold, no packets will be dropped.

In one aspect of the invention, the process of managing a queue of packets is particularly well suited for a hardware implementation. The following is pseudo-code that can be utilized to generate a hardware implementation in an Application Specific Integrated Circuit (ASIC):

```
For each packet arrival
{
    COMP_AVG = min(AVG_QUEUE_LEN, CURR_QUEUE_LEN)
    if (COMP_AVG + (RANDOM & MASK) > MAX_TH)
    {
        n = N
        MASK = 0
        drop(packet);
    }
    else
    {
        if (n > 0)
        {
            n - - ;
        }
        else
        {
            n = N;
            MASK = (MASK << 1) |1;
        }
        enqueue(packet);
    }
}
```

Symbol Explanation:

| | |
|---|---|
| COMP_AVG | Average queue length used for comparison against the thresholds |
| RANDOM | R-bit random number generator |
| MASK | R-bit mask for the random number |
| MAX_TH | Maximum threshold defined as "minimum threshold" + $2^R$ |
| N | Number of packets accepted between consecutive MASK shifts |

Initialization:

n := N
RAND_MASK := ~0

The above pseudo-code represents a possible implementation of the techniques that have been described previously. In order to make this implementation better suited for hardware, a mask that is stored in a shift register is utilized to mask bits off of a random number. As discussed above, a comparison average COMP_AVG is calculated and the sum of the COMP_AVG and the masked random number is compared to the maximum threshold MAX_TH.

If the COMP_AVG plus the masked random number is greater than the MAX_TH, the received packet is dropped. Additionally, the mask is reset to zero, which means that the mask will mask out all of the bits of the random number. In effect, this conceptually increases minimum threshold to the maximum threshold. However, as can be seen, the source code does not utilize an actual minimum threshold.

After a specified number of packets have been received without being dropped, this number being represented by N, the MASK is shifted to the left and a "1" is inserted from the right. This operation allows one less bit (the most significant bit) of the random number to be masked out. Accordingly, the range of the masked random number will increase in size exponentially by a power of 2.

With the embodiment shown above, a set of predefined dropping probability curves are exploited from time to time. The actual dropping curve utilized is selected according to the number of packets accepted in the queue since the last packet drop. When the queue is idle or after a period of moderate activity, the average queue size may be below the minimum threshold, which in this embodiment means that the mask will be all 1s and therefore the masked random number will represent its maximum potential range. In other words, the minimum threshold will be set to its lowest or original value.

When the queue gets congested, the average queue size will start to increase and after it crosses the minimum threshold (e.g., average queue size plus the masked random number is greater than the maximum threshold), sooner or later a packet will be dropped. After a packet is dropped, the mask is reset to 0, meaning that the probability to drop another packet in a row becomes drastically lower and is in fact virtually zero, unless the average queue size becomes greater than the maximum threshold.

The bit mask to be applied to the random number is extended by one bit by every N packets accepted in the queue. Each mask extension results in a doubling of the random number range, so the more packets are accepted in the queue and the less steep the probability curve becomes. The region with 0 drop probability shrinks and thus, the probability that the next packet will be dropped increases.

The mask extension process, if no drops occur, proceeds until the full random number range is used again. If a drop occurs earlier, the mask is reset to 0 and the whole process described above is repeated. In other words, the dropping probability curve moves towards the average queue size with a pace that depends on the packet arrival rate and the actual curve to be used depends on the number of accepted packets since the last drop.

The process described above is straightforward to implement in hardware because it does not involve any multiplication, division and/or other complex mathematical functions. The minimum and maximum thresholds are separated by a power of 2, namely $2^R$, where R is the number of bits in the random number (e.g., R=17). Although it is not necessary for a power of 2 to be utilized, it makes the hardware implementation of the techniques for managing a queue of packets extremely simple and more efficient.

Figure 7:
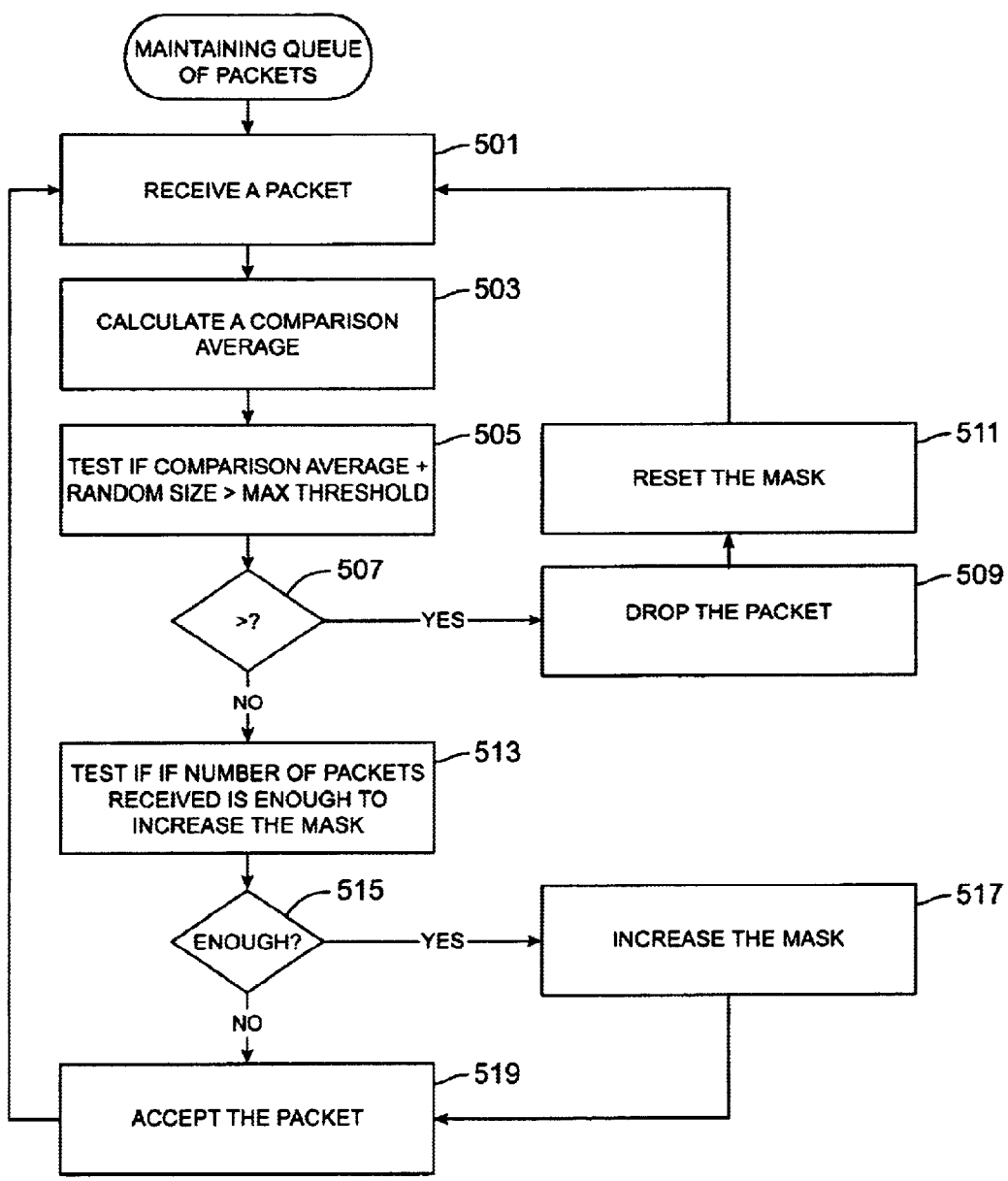
FIG. 7 shows a flow chart of another process of managing a queue of packets.

FIG. 7 shows a flow chart of a process of managing a queue of packets according to the pseudo-code shown above. At a step 501, a packet is received. A comparison average is calculated at a step 503. The comparison average can be calculated as the minimum of the average queue size and the current queue size. In other embodiments, the comparison average can be calculated in different ways and can be equivalent to the average queue size.

At a step 505, a test is performed to determine if the comparison average plus a random size is greater than the maximum threshold. The random size can be calculated as above by a bit wise AND of a mask and a random number.

If it is determined that the sum of the comparison average and the random size is greater than the maximum threshold at a step 507, the packet is dropped at a step 509. At a step 511, the mask is reset (i.e., set equal to 0).

At a step 513, it is determined if the number of packets received without being dropped is enough to increase the mask. If it is enough to increase the mask at a step 515, the mask is increased at a step 517. The mask can be increased by shifting the mask to the left and inserting a "1" from the right utilizing a shift register or any other way known in the art. At a step 519, the packet is accepted.

The above discussion has described embodiments where each of the packets is treated the same way. In other embodiments, packets can belong to different classes of service that need to be serviced differently. For example, a packet belonging to a "standard" class of service could be discarded with a higher probability with respect to a packet belonging to a "premium" class of service. This can be accomplished by assigning to each class of service different thresholds (or marking probabilities).

Figure 8:
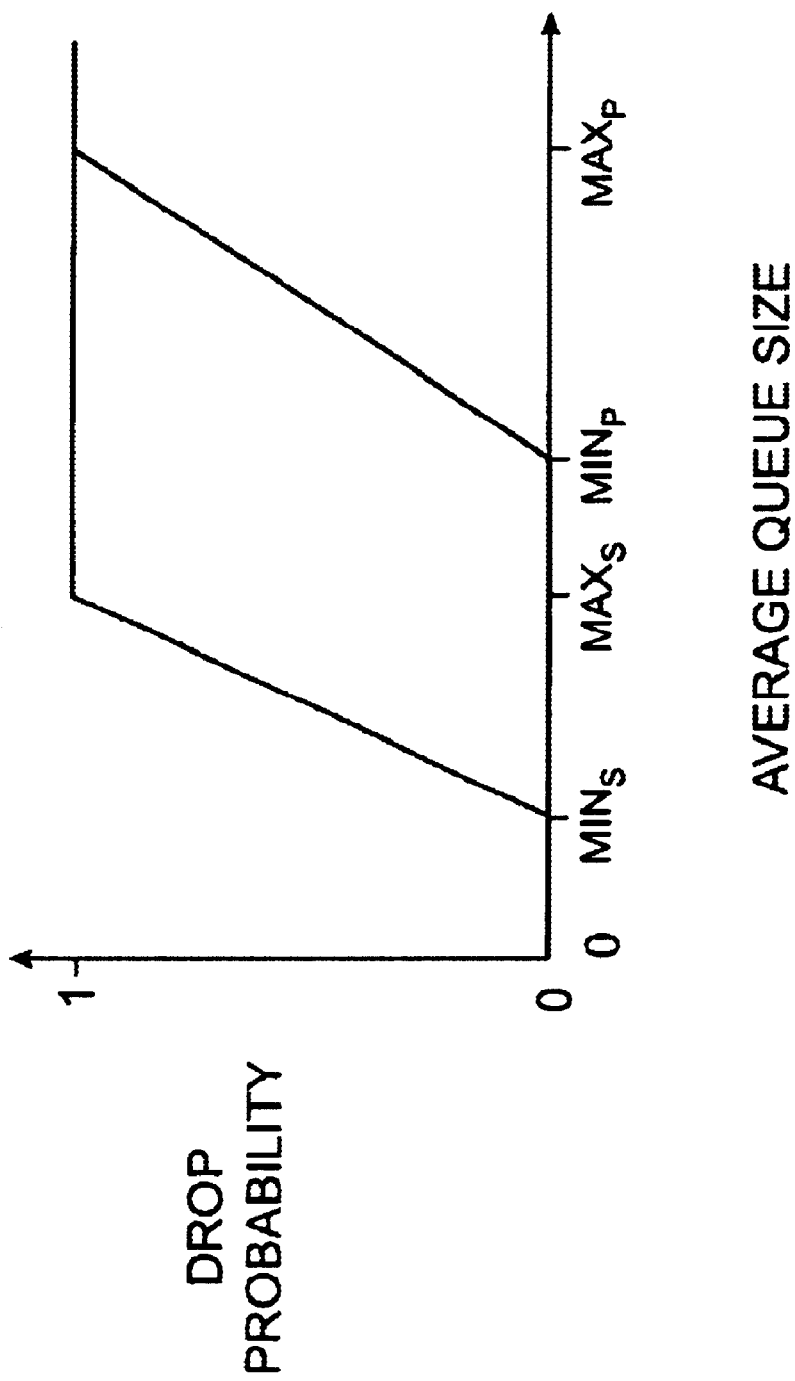
FIG. 8 shows a graphical plot of drop probability versus average queue size for another embodiment of the invention that has different thresholds and probabilities for different classes of packets.

In order to further illustrate how to differentiate the treatment between or among a number of classes of service, FIG. 8 shows a graphical plot of the drop probability versus the average queue size for packets belonging to a standard and to a premium class of service. As shown, there is a minimum and maximum threshold for the standard class of service, denoted by the subscript S. Additionally, there is a minimum and maximum threshold for the premium class of service, denoted by the subscript P.

As can be seen, the minimum and maximum thresholds for the standard packets are lower than the premium packets. Accordingly, the standard packets will be dropped earlier and at a higher rate or probability than the premium packets when the average queue size increases.

For each incoming packet the average queue size is compared against the threshold associated with the packet's class of service and the appropriate drop probability curve is selected. Once the probability curve is selected, the process can proceed as described above for a single class of service for packets.

The following is pseudo-code that can be utilized to support multiple classes of service for packets:

```
For each packet arrival
{
    COS = class_of_service(packet)
    COMP_AVG = min (AVG_QUEUE_LEN,
    CURR_QUEUE_LEN)
    If (COMP_AVG +
    (RANDOM & RND_SIZE[COS] & MASK[COS]) >
    MAX_TH[COS}))
        n[COS] = N[COS];
        MASK[COS] = 0;
        drop(packet);
    }
    else
    {
        if (n[COS] > 0)
            n[COS] - -;
        else
        }
            n[COS] = N[COS];
            MASK[COS] = (MASK[COS] << 1) |1;
        }
        enqueue (packet)
    }
}
```

Symbols Explanation:

| | |
|---|---|
| COMP_AVG | Average queue length used for comparison against the thresholds |
| RANDOM | R-bit random number generator |
| MASK[COS] | Array of R-bit running masks |
| RND_SIZE[COS] | Array of R-bit running masks |
| MAX_TH[COS] | Array of maximum thresholds |
| N[COS] | Array of number of packets accepted between consecutive MASK[COS] shifts |
| n[COS] | Array of counters of packets accepted |

Initialization

N[COS] = usually 5
n[COS] = N[COS]
MASK[COS] = ~0
MAX_TH[COS] = varies by class of service As can be seen above, the support for multiple classes of service for packets can basically be summed up as making many of the variables into arrays of variables where each variable in the array is for a specific class of service. Although the above has described only two classes of service for simplicity, as the source code illustrates, the different classes of service can be extended to any number of classes.

As described above, the average queue size can be calculated according the free pool size rather than the queue size. Many ASIC designers prefer to deal with the free pool size rather than the queue size. Accordingly, the following pseudo-code is one implementation that utilizes the free pool size:

```
// Average free pool size calculation
For each average free pool sample timer tick
{
    AVG_FP_SIZE = (AVG_FP_SIZE * (2 ^ AVG_WEIGHT - 1) +
        CURR_FP_SIZE)/2 ^ AVG_WEIGHT
}
// Drop decision
For each packet
{
    COS = class_of_service(packet)
    COMP_AVG FP = max(AVG_FP_SIZE, CURR_FP_SIZE)
    If (COMP_AVG_FP < (RANDOM & RND_SIZE[COS] &
    MASK[COS] +
        MIN_TH[COS]))
    {
        n[COS] = N[COS];
        MASK[COS] = 0;
        Drop (packet);
    }
    else
    }
        if n[COS] > 0;
            n[COS] - -;
        else
        {
            n[COS] = N[COS];
            MASK[COS] = (MASK[COS] << 1) |1;
        }
        enqueue (packet)
    }
}
```

Symbols Explanation

| | |
|---|---|
| CURR_FP_SIZE | Current free pool size |
| AVG_FP_SIZE | Average free pool size |
| COMP_AVG_FP | Comparison free pool size |
| AVG_WEIGHT | Weight used for the average free pool computation |
| RANDOM | R-bit random number generator |
| MASK[COS] | Array of R-bit running masks |

-continued

| | |
|---|---|
| RND_SIZE[COS] | Array of size of random numbers |
| N[COS] | Array of numbers of packets accepted between consecutive MASK[COS] shifts |
| n[COS] | Array of counters of packets accepted |

Initialization

AVG_WEIGHT = usually 9
N[COS] = usually 5
n[COS] = N[COS]
MASK[COS] = ~0;
MAX_TH[COS] = varies by class of service The above source code illustrates an embodiment that provides multiple classes of service for packets and additionally utilizes the average free pool size and the current free pool size in determining whether to drop a packet. The random number and mask operate substantially as described above in the other embodiments.

While the above is a complete description of preferred embodiments of the invention, alternatives, modifications and equivalents could be used. It should be evident that the invention is equally applicable by making appropriate modifications to the embodiments described above. For example, although the above has described processes of managing a queue of packets in a LAN, the invention can be advantageously applied to queues in other networks including WANs like the Internet. Therefore, the above description should not be taken as limiting the scope of the invention that is defined by the metes and bounds of the appended claims along with their full scope of equivalents.

What is claimed is:

1. A method of managing a queue of packets, comprising:
   receiving a packet;
   calculating an average queue size;
   if the average queue size is above a minimum threshold, dropping the packet according to a probability; and
   if the packet is dropped, increasing the minimum threshold.

2. The method of claim 1, wherein if the average queue size is greater than a maximum threshold, the probability is 1 so the packet is dropped.

3. The method of claim 1, further comprising determining a class of service for the packet, where the class of service defines the minimum threshold for the packet.

4. A method of managing a queue of packets, comprising:
   receiving a packet;
   calculating an average queue size;
   if the average queue size is above a minimum threshold, dropping the packet according to a probability; and
   if the packet is dropped, increasing the minimum threshold, wherein increasing the minimum threshold includes setting the minimum threshold equal to a maximum threshold.

5. A method of managing a queue of packets, comprising:
   receiving a packet;
   calculating an average queue size;
   if the average queue size is above a minimum threshold, dropping the packet according to a probability;
   if the packet is dropped, increasing the minimum threshold; and
   if a specified number of packets are received without dropping a packet, decreasing the minimum threshold.

6. The method of claim 5, wherein the minimum threshold is decreased each time the specified number of packets are received without dropping a packet.

7. The method of claim 6, wherein the minimum threshold is decreased by an amount that increases exponentially each time the specified number of packets are received without dropping a packet.

8. A method of managing a queue of packets, comprising:
   receiving a packet;
   calculating an average queue size;
   determining a current queue size;
   calculating a comparison queue size as a lesser of the average queue size and the current queue size; and
   utilizing the comparison queue size to determine whether to drop the packet.

9. The method of claim 8, further comprising calculating the average queue size at specified time intervals.

10. The method of claim 8, further comprising if the comparison queue size is above a minimum threshold, dropping the packet according to a probability.

11. The method of claim 8, wherein if the average queue size is greater than a maximum threshold, the probability is 1 so the packet is dropped.

12. A method of managing a queue of packets, comprising:
    receiving a packet;
    calculating an average queue size;
    determining a current queue size;
    calculating a comparison queue size as a lesser of the average queue size and the current queue size; and
    if the comparison queue size is above a minimum threshold, dropping the packet according to a probability; and
    if the packet is dropped, increasing the minimum threshold.

13. The method of claim 12, further comprising calculating the average queue size at specified time intervals.

14. The method of claim 12, wherein increasing the minimum threshold includes setting the minimum threshold equal to a maximum threshold.

15. The method of claim 12, further comprising if a specified number of packets are received without dropping a packet, decreasing the minimum threshold.

16. The method of claim 15, wherein the minimum threshold is decreased each time the specified number of packets are received without dropping a packet.

17. The method of claim 16, wherein the minimum threshold is decreased by an amount that increases exponentially each time the specified number of packets are received without dropping a packet.

18. The method of claim 12, wherein if the average queue size is greater than a maximum threshold, the probability is 1 so the packet is dropped.

19. The method of claim 12, further comprising determining a class of service for the packet, where the class of service defines the minimum threshold for the packet.

20. A method of managing a queue of packets, comprising:
    receiving a packet;
    generating a random number;
    utilizing a mask to mask the random number;
    if a sum of a queue size and the masked random number is greater than a maximum threshold, dropping the packet and resetting the mask; and
    when a specified number of packets are received without dropping a packet, shifting the mask to increase the potential size of the masked random number.

21. The method of claim 20, wherein the queue size is an average queue size.

22. The method of claim 20, wherein the queue size is a lesser of an average queue size and a current queue size.

23. The method of claim 20, further comprising determining a class of service for the packet, where the class of service defines at least one of the mask and the maximum threshold.

24. An apparatus that manages a queue of packets, comprising:

- means for receiving a packet;
- means for calculating an average queue size;
- means for dropping the packet according to a probability if the average queue size is above a minimum threshold; and
- means for increasing the minimum threshold if the packet is dropped.

25. An apparatus that manages a queue of packets, comprising:

- means for receiving a packet;
- means for calculating an average queue size;
- means for determining a current queue size;
- means for calculating a comparison queue size as a lesser of the average queue size and the current queue size; and
- means for utilizing the comparison queue size to determine whether to drop the packet.

26. An apparatus that manages a queue of packets, comprising:

- means for receiving a packet;
- means for calculating an average queue size;
- means for determining a current queue size;
- means for calculating a comparison queue size as a lesser of the average queue size and the current queue size; and
- means for dropping the packet according to a probability if the comparison queue size is above a minimum threshold; and
- means for increasing the minimum threshold if the packet is dropped.

27. An apparatus that manages a queue of packets, comprising:

- means for receiving a packet;
- means for generating a random number;
- means for utilizing a mask to mask the random number;
- means for dropping the packet and resetting the mask if a sum of a queue size and the masked random number is greater than a maximum threshold; and
- means for shifting the mask to increase the potential size of the masked random number when a specified number of packets are received without dropping a packet.

* * * * *